(12) United States Patent
Till

(10) Patent No.: US 7,866,591 B2
(45) Date of Patent: Jan. 11, 2011

(54) WINDING MACHINE FOR WINDING THREAD-SHAPED WINDING MATERIAL

(75) Inventor: Jürgen-Matthias Till, Augsburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/225,836

(22) PCT Filed: Feb. 20, 2007

(86) PCT No.: PCT/EP2007/051595

§ 371 (c)(1),
(2), (4) Date: Sep. 30, 2008

(87) PCT Pub. No.: WO2007/113045

PCT Pub. Date: Oct. 11, 2007

(65) Prior Publication Data

US 2009/0166464 A1 Jul. 2, 2009

(30) Foreign Application Priority Data

Mar. 31, 2006 (DE) .................. 10 2006 015 030

(51) Int. Cl.
*B65H 54/28* (2006.01)
(52) U.S. Cl. .................................. 242/484.1
(58) Field of Classification Search .............. 242/476.7, 242/484, 484.1
See application file for complete search history.

(56) References Cited

U.S. PATENT DOCUMENTS

| 2,283,393 A | * | 5/1942 | Simons | 242/484 |
| 3,946,957 A | * | 3/1976 | Van Gunten et al. | 242/472.8 |
| 5,540,495 A | * | 7/1996 | Pickel | 366/78 |

FOREIGN PATENT DOCUMENTS

| DE | 4344335 A1 | 6/1995 |
| DE | 19723630 A1 | 12/1998 |
| DE | 29908962 U1 | 9/1999 |
| DE | 10021963 A1 | 12/2000 |
| FR | 2626565 A1 | 8/1989 |
| JP | 4968167 A | 7/1974 |
| JP | 60197568 A | 10/1985 |
| WO | WO 2005122366 A1 | 12/2005 |

* cited by examiner

*Primary Examiner*—William E Dondero

(57) ABSTRACT

A winding machine for winding thread-shaped winding material has a winding motor, a positioning drive and a control device. The winding motor has a motor housing and a motor shaft, wherein the motor shaft can rotate about a rotation axis. The motor shaft is connected fixedly in terms of rotation to a spool holder, on which at least one reel is arranged. The winding machine has at least one thread-feeding means per reel, by means of which thread-feeding means the thread-shaped winding material can be fed to the respective reel. During the rotation of the motor shaft about its shaft axis, the spool holder can be position axially along the shaft axis relative to the motor housing by means of the positioning drive. The winding motor and the positioning drive can be actuated in a coordinated manner by means of the control device.

9 Claims, 2 Drawing Sheets

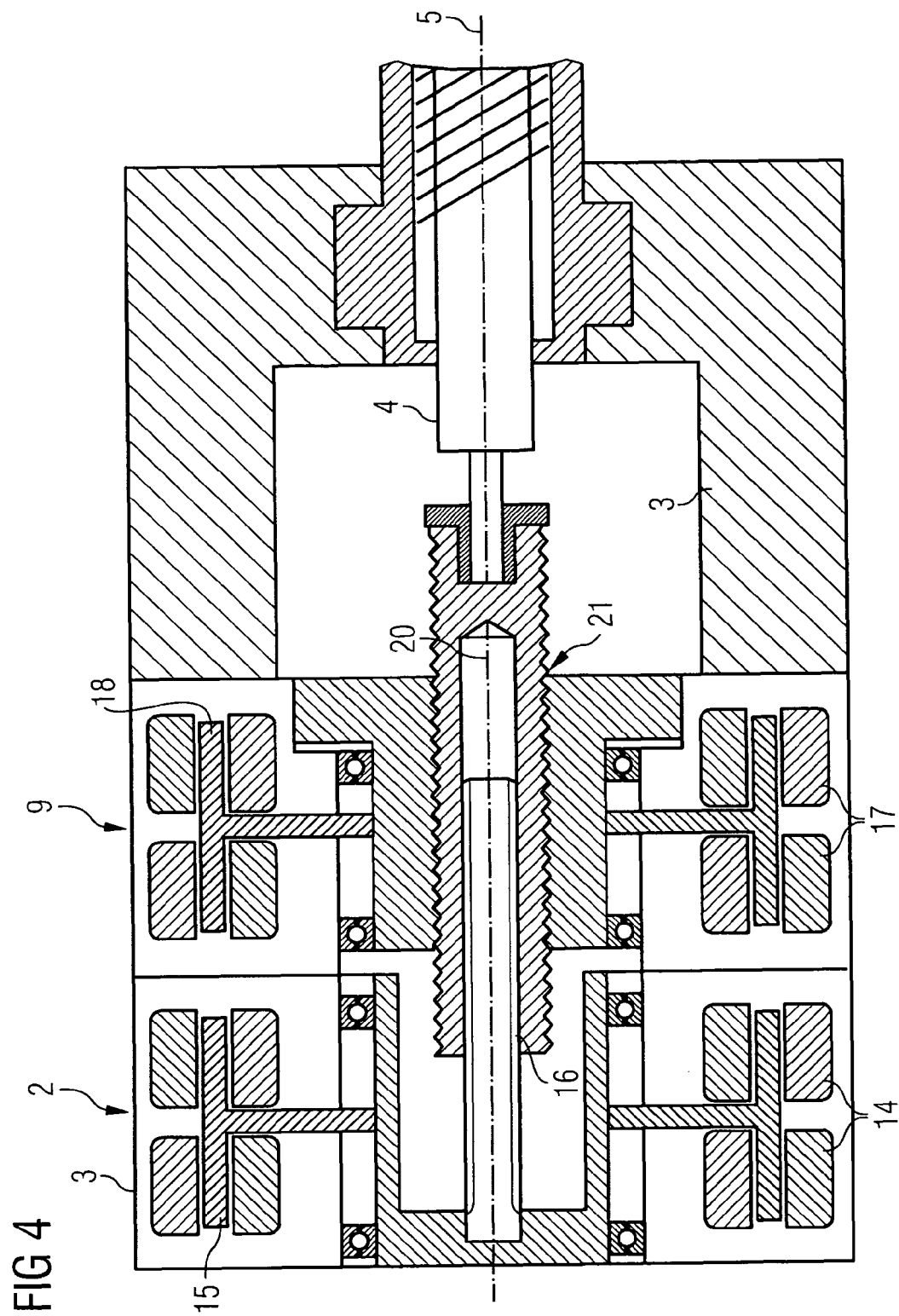

WINDING MACHINE FOR WINDING THREAD-SHAPED WINDING MATERIAL

CROSS REFERENCE TO RELATED APPLICATIONS

This application is the US National Stage of International Application No. PCT/EP2007/051595, filed Feb. 20, 2007 and claims the benefit thereof. The International Application claims the benefits of German application No. 10 2006 015 030.9 filed Mar. 31, 2006, both of the applications are incorporated by reference herein in their entirety.

FIELD OF THE INVENTION

The present invention relates to a winding machine for winding thread-shaped winding material.

BACKGROUND OF THE INVENTION

Winding machines for winding thread-shaped winding material are commonly known. They have a winding motor that has a motor housing and a motor shaft, with the motor shaft being rotatable around a shaft axis. The motor shaft is linked in a rotationally fixed manner to a spool holder on which at least one reel is arranged. The winding machine has for each reel at least one thread-feeding means by means of which the thread-shaped winding material can be fed to the respective reel.

The winding machine furthermore has in the prior art what is termed a cross-winding device. Axial positions at which the thread-shaped winding material is fed to the respective reel can be set by means of the cross-winding device.

SUMMARY OF THE INVENTION

The object of the present invention is to provide a winding machine of the type that cited in the introduction and in which the cross-winding device can be dispensed with.

The winding machine therefore inventively has a positioning drive by means of which the spool holder can be positioned axially along the shaft axis relative to the motor housing while the motor shaft is rotating around its shaft axis. The winding machine furthermore inventively has a control device by means of which the winding motor and positioning drive can be driven in a coordinated manner.

The term "positioning" is not intended to be understood in the sense that only two axial end positions of the spool holder relative to the motor housing can be set. What is meant by the term "positioning" is rather that—within the scope of positioning accuracy—any intermediate positions between the two end positions are intended also to be settable.

The positioning drive is as a general rule a position-controlled drive. Depending on how the winding machine is embodied, the winding motor can be a position-controlled or variable-speed motor.

In the simplest embodiment of the inventive winding machine the spool holder is linked axially movably to the motor shaft and rotationally movably and axially non-movably to the positioning drive. Rotating of the spool holder by means of the winding motor will in that case have no direct influence on the spool holder's axial positioning by means of the positioning drive, and vice versa.

It is also possible for the spool holder to be linked axially non-movably to the motor shaft, for the motor shaft to be mounted axially movably in the motor housing, and for the positioning drive to act upon the spool holder via the motor shaft. The motor shaft will in that case preferably be linked rotationally movably to the positioning drive.

The positioning drive can be arranged in the motor housing. That will result in a particularly compact structure.

The thread-feeding means are preferably embodied as spinning nozzles.

BRIEF DESCRIPTION OF THE DRAWINGS

Further advantages and specifics will emerge from the following description of exemplary embodiments shown as block diagrams:

FIG. 4 shows a possible alternative embodiment of a winding machine.

DETAILED DESCRIPTION OF THE INVENTION

Figure 1:
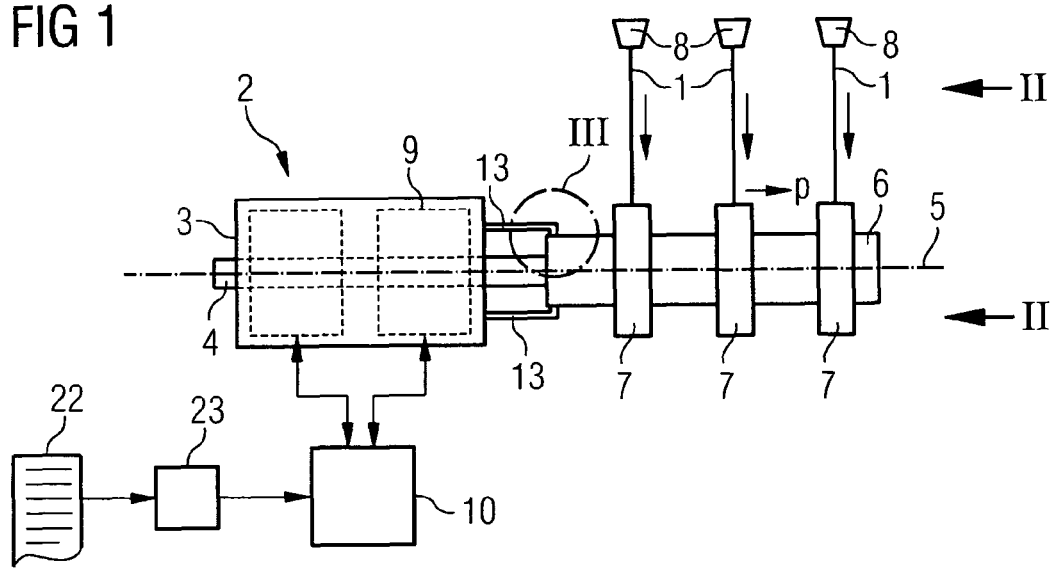
FIG. 1 is a schematic of a winding machine for winding thread-shaped winding material.

According to FIG. 1 a winding machine for winding thread-shaped winding material (for example yarns or optical waveguides made of glass fiber or plastic) 1 has a winding motor 2. The winding motor 2 has a motor housing 3. Arranged—non-movably relative to the motor housing 3—in the motor housing 3 is a stator. A rotor is furthermore mounted rotationally movably in the motor housing 3. The rotor acts upon a motor shaft 4. It is hence able to rotate the motor shaft 4 around a shaft axis 5. The stator and rotor of the winding motor 2 are not included in what is shown in FIG. 1.

The rotor of the winding motor 2 is according to FIG. 1 mounted axially non-movably in the motor housing 3. So while able to rotate around the shaft axis 5 the rotor cannot, conversely, be moved along the shaft axis 5.

The motor shaft 4 is in the exemplary embodiment shown in FIG. 1 mounted likewise axially non-movably. It could, though—see the later explanations relating to the second exemplary embodiment—also be mounted axially movably in the motor housing 3.

The motor shaft 4 is linked to a spool holder 6 in a rotationally fixed manner. At least one reel 7 is arranged on the spool holder 6. Even a plurality of reels 7 are arranged on the spool holder 6 according to FIG. 1. Three such reels 7 are shown in FIG. 1. There could, though, also be another number of reels 7, for example two, four, five, or more reels 7.

The winding machine has for each reel 7 at least one—according to FIG. 1 precisely one—thread-feeding means 8. The thread-shaped winding material 1 can be fed to the respective reel 7 by means of the thread-feeding means 8. The thread-shaped winding material 1 is fed to the respective reel 7 preferably in a radial-tangential plane, meaning in a plane perpendicular to the shaft axis 5. The thread-shaped winding material 1 can be wound on by rotating the spool holder 6 accordingly.

For the thread-shaped winding material 1 to be wound properly it is necessary for an axial position p at which the thread-shaped winding material 1 fed to the respective reel 7 is wound onto it to be varied in keeping with a predetermined winding pattern. The winding pattern can depend on, for example, the material and/or the thickness of the thread-shaped winding material 1 and on any intended further use of the wound thread-shaped winding material 1. The thread-feeding means 8 are in the prior art arranged on what is termed a cross-winding device for varying the axial position p.

Instances of cross-winding devices of said type employed in the prior are driven birotors and driven reversing screwthread shafts. The cross-winding device is in the prior art arranged between spinning nozzles and the reels 7.

The present invention has, by contrast, no cross-winding device of said type. The inventive winding machine has a positioning drive 9 in order to be able nonetheless to set the axial positions p in a defined and proper manner. The positioning drive 9 is linked directly or indirectly to the spool holder 6. The spool holder 6 can be positioned axially relative to the motor housing 3 along the shaft axis 5 by means of the positioning drive 9. The position of the spool holder 6 can be set while the motor shaft 4 is rotating around its shaft axis 5, meaning during the winding process.

The winding machine furthermore has a control device 10. The winding motor 2 and positioning drive 9 can be driven in a coordinated manner by means of the control device 10 so that in particular the axial position p can be correctly varied during the winding process in accordance with the predetermined winding pattern.

As mentioned above, a cross-winding device is unnecessary in the inventive winding machine. It is hence possible for the thread-feeding means 8 to be embodied as spinning nozzles 8.

Figure 2:
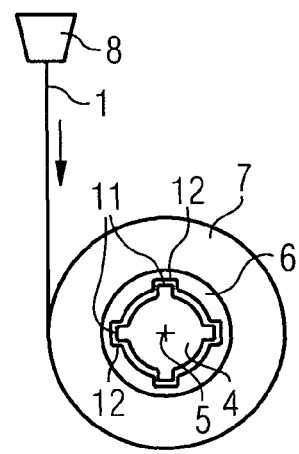
FIG. 2 is a view from the direction II shown in FIG. 1.
Figure 3:
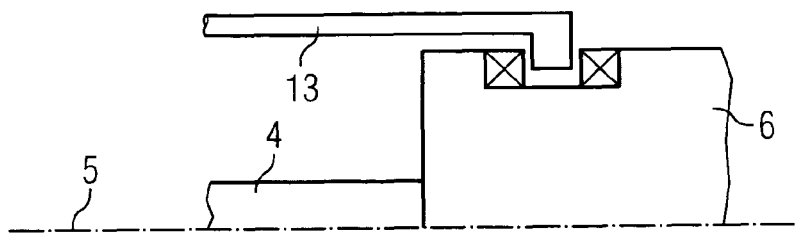
FIG. 3 is a detail according to a circle III shown in FIG. 1.

A first possible embodiment of the inventive winding machine shown in FIG. 1 is described below in conjunction with FIGS. 2 and 3.

Although linked in the first embodiment of the inventive winding machine in a rotationally fixed manner to the motor shaft 4, the spool holder 6 is linked thereto axially movably. For example the motor shaft 4 and spool holder 6 can according to FIG. 2 have gear teeth 11, 12 extending in the axial direction.

The spool holder 6 is in the first embodiment furthermore linked to the positioning drive 9 rotationally movably and axially non-movably. For example the positioning drive 9 can in keeping with FIG. 3 have arms 13 which relative to the positioning drive 9 (and hence relative also to the motor housing 3) are axially movable and mounted in the spool holder 6 rotationally movably but axially non-movably.

A second possible embodiment of the inventive winding machine is described below in conjunction with FIG. 4. In that exemplary embodiment the spool holder 6 is linked to the motor shaft 4 not only in a rotationally fixed manner but also axially non-movably. The motor shaft 4 is, though, mounted in the motor housing 3 axially movably. The positioning drive 9 acts in that embodiment upon the spool holder 6 via the motor shaft 4.

According to FIG. 4 the winding motor 2 has a stator 14 and a rotor 15. The stator 14 is arranged in the motor housing 3 in a fixed manner. The rotor 15 is mounted in the motor housing 3 rotationally movably but axially non-movably. The rotor 15 is linked to the motor shaft 4 via linear guides 16. The linear guides 16 can be embodied similarly to the gear teeth 11, 12 of the motor shaft 4 and spool holder 6 according to FIG. 2. Although the motor shaft 4 is hence linked to the rotor 15 of the winding motor 2 in a rotationally fixed manner, it is linked thereto axially movably.

According to FIG. 4 the positioning drive 9 likewise has a stator 17 and a rotor 18. The stator 17 of the positioning drive 9 is arranged in a housing 19 of the positioning drive 9 in a fixed manner. The rotor 18 is mounted in the housing 19 of the positioning drive 9 rotationally movably but axially non-movably. It has a rotary axis 20 aligned with the shaft axis 5.

The rotor 18 of the positioning drive 9 acts upon the motor shaft 4 via a thread 21, for example a ball groove thread 21. The motor shaft 4 is hence linked rotationally movably to the positioning drive 9.

To effect a purely rotational movement of the spool holder 6 around the shaft axis 5, the rotors 15, 18 of the winding motor 2 and positioning drive 9 are in the embodiment shown in FIG. 4 driven at the same rotational speed and in the same direction of rotation. The angular momentum exerted thereby on the spool holder 6 is, though, applied exclusively or almost exclusively by the winding motor 2. The positioning drive 9 co-rotates only in its idling state.

To effect a purely linear axial movement of the spool holder 6 along the shaft axis 5, exclusively the rotor 18 of the positioning drive 9 is rotated in the embodiment according to FIG. 4. The angle of rotation of the rotor 18 of the positioning drive 9 can be readily converted into a corresponding axial movement of the spool holder 6 via the pitch of the thread 21.

If an axial movement of the spool holder 6 is to be coordinated with a simultaneously occurring rotational movement of the spool holder 6, then the rotational movement of the spool holder 6 will be determined exclusively by rotating of the rotor 14 of the winding motor 2. The linear axial movement of the spool holder 6 is the product of the difference between the rotational movements of the rotors 15, 18 in conjunction with the pitch of the thread 21.

The winding motor 2 and positioning drive 9 can be arranged mutually separately. The positioning drive 9 is, though, preferably arranged in the motor housing 3. That applies both to the embodiment according to FIGS. 1 to 3 and to the embodiment according to FIG. 4.

Other combined drive devices can also be employed provided they are able to effect both the axial movement and rotating of the motor shaft 4. For example in a uniform motor housing 3 the motor shaft 4 can be mounted such as to be both rotatable around its shaft axis 5 and axially movable along the shaft axis 5. A rotor can in that case be mounted on the motor shaft 4. Two mutually independently drivable winding systems that act upon the rotor can in that case be arranged in the motor housing 3. The motor shaft 4 can be rotated by means of one of the winding systems and axially moved by means of the other. Drive devices of said kind are currently being developed by the applicant and will soon be put onto the market under the name "hybrid motor".

Cross-winding is hence in the inventive winding machine effected by the axial movement of the spool holder 6 itself. Cross-winding is thus possible in a simple manner without the need for a separate cross-winding device. It will furthermore in particular no longer be necessary to mechanically re-equip the winding machine to change the winding pattern. Rather it will be necessary only to appropriately match a control program 22 of the control device 10 that is fed to the control device 10 via a corresponding data carrier 23. Crush marks that may occur in the thread-shaped winding material 1 when mechanical cross-winding devices belonging to the prior art are used can furthermore be avoided.

The invention claimed is:

1. A winding machine for winding a thread-shaped winding material, comprising:
    a winding motor;
    a motor housing arranged on the winding motor;
    a motor shaft arranged on the winding motor that rotates around a shaft axis;
    a spool holder connected to the motor shaft;
    a reel arranged on the spool holder;
    a thread-feeding device connected to the reel that feeds the thread-shaped winding material to the reel;

a positioning drive that positions the spool holder axially along the shaft axis relative to the motor housing while the motor shaft is rotating around the shaft axis, said positioning drive including a rotor, said rotor configured to rotate about the shaft axis;

a control device that drives the winding motor and the positioning drive coordinately;

wherein the positioning drive is arranged in the motor housing, and wherein said positioning drive rotor is configured to rotate within a thread on the motor shaft, and wherein said spool holder is configured to axially shift along the shaft axis relative to the motor housing, based on an angle of rotation of said positioning drive rotor with respect to the shaft axis, and a pitch of the thread on the motor shaft.

2. The winding machine as claimed in claim 1, wherein the spool holder is axially movably connected to the motor shaft.

3. The winding machine as claimed in claim 2, wherein the spool holder is rotationally movably and axially non-movably connected to the positioning drive.

4. The winding machine as claimed in claim 1, wherein the spool holder is axially non-movably connected to the motor shaft.

5. The winding machine as claimed in claim 4, wherein the motor shaft is axially movably mounted in the motor housing and the positioning drive positions the spool holder via the motor shaft.

6. The winding machine as claimed in claim 5, wherein the motor shaft is rotationally movably connected to the positioning drive.

7. The winding machine as claimed in claim 1, wherein the thread-feeding device is a spinning nozzle.

8. The winding machine as claimed in claim 1, wherein the motor shaft is rotationally connected to the spool holder.

9. The winding machine as claimed in claim 1, wherein the control device drives the winding motor and the positioning drive coordinately by a control program.

\* \* \* \* \*